United States Patent [19]

Liu

[11] Patent Number: 4,992,505

[45] Date of Patent: Feb. 12, 1991

[54] FLAME RETARDANT ELASTOMERIC COMPOUNDS

[75] Inventor: Nan-I Liu, Mt. Vernon, Ind.

[73] Assignee: General Electric Company, Mt. Vernon, Ind.

[21] Appl. No.: 216,015

[22] Filed: Jul. 7, 1988

[51] Int. Cl.$^5$ ............................................. C08K 5/53
[52] U.S. Cl. ................... 524/416; 524/539; 524/120
[58] Field of Search ................. 524/416, 539, 120

[56] References Cited

U.S. PATENT DOCUMENTS

| | | | |
|---|---|---|---|
| Re. 30,946 | 5/1982 | Hoffman et al. | 524/416 |
| 3,397,035 | 8/1968 | Shen | 524/416 |
| 3,423,343 | 1/1969 | Barnett | 524/140 |
| 3,513,114 | 5/1970 | Hahn et al. | 524/317 |
| 4,217,267 | 8/1980 | Hoffman et al. | 524/120 |
| 4,244,858 | 1/1981 | Tacke et al. | 524/416 |
| 4,347,334 | 8/1982 | Staendeke et al. | 524/416 |
| 4,410,648 | 10/1983 | Kato et al. | 524/416 |
| 4,556,688 | 12/1985 | McCready et al. | 525/437 |
| 4,594,377 | 6/1986 | McCready | 524/101 |
| 4,745,027 | 5/1988 | Maeda et al. | 524/416 |

*Primary Examiner*—John Kight
*Assistant Examiner*—Kriellion Morgan
*Attorney, Agent, or Firm*—William Mufatti; Daniel DeJoseph

[57] ABSTRACT

Disclosed are flame retardant polyetherimide ester compositions comprising:
(i) at least one polyetherimide ester resin; and
(ii) a flame retardant effective amount of a mixture comprising (a) at least one polyphosphonate ester, and (b) at least one ammonium polyphosphate.

31 Claims, No Drawings

FLAME RETARDANT ELASTOMERIC COMPOUNDS

BACKGROUND OF THE INVENTION

Polyetherimide ester elastomers comprised of the reaction products of (a) a low molecular weight diol, (b) a dicarboxylic acid, (c) a high molecular weight poly(oxy alkylene)diamine, and (d) a tricarboxylic acid or its derivative are known and are described in U.S. Pat. Nos. 4,544,734 and 4,556,705 to McCready and in U.S. Pat. No. 4,556,688 to McCready et al. These polyetherimide esters exhibit excellent stress-strain properties, low modulus set, high melting temperatures and/or excellent strength/toughness characteristics as well as superior flexibility, which properties render said polyetherimide esters especially suitable for molding and extrusion applications.

Additionally, polyetherimide ester elastomer resins may be modified to improve certain physical properties and further broaden their scope of application by incorporating therein various additives including fillers and reinforcing agents to enhance toughness and vary the stiffness of the material. Further, such resIns and modified resIns can be blended with other thermoplastic materials to enhance various physical properties and improve processability.

However, many polyetherimide ester elastomer and blends thereof suffer from and their applications are limited by their high flammability. In particular where such resins are to be used for electrical parts, wire coating and building materials, it is most desirable and often required that such materials be resistant to or have low flammability.

Many flame retardant compounds that are utilized in plastics can adversely effect the physical properties of the resin material. Also, it is well recognized that such flame retardant compounds tend to have a high degree of specificity, i.e., they are not universally effective. Rather, they may be inoperable or their effectiveness may vary from poor to excellent depending upon the particular material to be flame retardant.

In selecting suitable flame retardants, it is important to identify flame retardant agents which will impart flame retardancy to the polymer material and still satisfy the performance criteria for the materials. Thus, in addition to achieving flame retardancy, the flame retardant polymeric composition must possess processability, substantially retain to a substantial degree its specified physical properties, exhibit long term aging compatibility and pose no environmental hazards.

With particular reference to polyetherimide ester elastomers it has generally been difficult to adequately render such materials flame retardant without sacrificing, to some degree, their inherent superior physical properties. Specifically, the use of conventional flame retardant additives, in conventional amounts, may generally cause marked decreases in the some of the advantageous physical properties of the elastomers.

SUMMARY OF THE INVENTION

The instant invention is directed to flame retardant polyetheriMide ester elastomer compositions. These compositions are comprised of at least one polyetherimide ester elastomer (hereinafter alternatively referred to as "elastomer") and a flame retardant effective amount of a mixture of (a) a polyphosphonate ester, and (b) an ammonium phosphate.

DETAILED DESCRIPTION OF THE INVENTION

In accordance with the instant invention there are provided flame retardant elastomer compositions. These flame retardant elastomer compositions are comprised of:
(1) at least one polyetherimide ester elastomer; and
(2) an effective flame retardant amount of a mixture of (a) a polyphosphonate ester, and (b) an ammonium phosphate.

The polyetherimide ester elastomers utilized in the invention contain imide groups, polyether groups, and ester groups in the polymer chain. They are comprised of the reaction products of:
(i) at least one diol;
(ii) at least one dicarboxylic acid or its ester forming reactive derivative; and
(iii) a set of reactants selected from
(a) (1) at least one high molecular weight poly(oxy alkylene)diamine, and (2) at least one tricarboxylic acid or its derivative, or
(b) at least one high molecular weight polyoxyalkylene diimide diacid.

Suitable diols (i) for use in the preparation of the polyetherimide ester polymers of the present invention include the saturated and unsaturated aliphatic and cycloaliphatic dihydroxy compounds as well as the aromatic dihydroxy compounds. These diols are preferably of a low molecular weight, i.e., having a molecular weight of about 300 or less. When used herein, the term "diol" and "low molecular weight diol" should be construed to include equivalent ester forming derivatives thereof provided, however, that the aforementioned molecular weight requirement pertains to the diols only and not to their ester forming derivatives. Exemplary of ester forming derivatives of diols there may be given the acetates of the diols as well as, for example, ethylene oxide or ethylene carbonate for ethylene glycol.

The preferred saturated and unsaturated aliphatic and cycloaliphatic diols are those having from 2 to about 15 carbon atoms. Exemplary of these diols there may be given ethylene glycol, propanediol, butanediol, pentanediol, 2-methyl propanediol, 2,2-dimethyl propanediol, hexanediol, decanediol, 1,2-, 1,3- and 1,4- cyclohexane dimethanol, butenediol, hexenediol, etc. Especially preferred are 1,4-butanediol and mixtures thereof with hexanediol, 1.4-cyclohexane dimethanol, or butenediol, most preferably 1,4-butanediol.

Aromatic diols suitable for use in the practice of the present invention are generally those having from 6 to about 15 carbon atoms. Included among the aromatic dihydroxy compounds are resorcinol, hydroquinone, 1,5-dihydroxy naphthalene, 4,4'-dihydroxy naphthalene, 4.4'-dihydroxy diphenyl, bis(p-hydroxy phenyl)methane and bis(p-hydroxy phenyl)-2,2-propane.

Especially preferred diols are the saturated aliphatic diols, mixtures thereof, and mixtures of a saturated diol(s) with an unsaturated diol(s), wherein each diol contains from 2 to about 8 carbon atoms. Where more than one diol is employed, it is generally preferred that at least about 60 mole %, based on the total diol content, be the same diol, more preferably at least 80 mole %. As mentioned above, the preferred compositions are those in which 1,4-butanediol is present in a predominant amount, most preferably when 1,4-butanediol is the only diol.

Dicarboxylic acids (ii) which are suitable for use in the practice of the present invention are aliphatic, cycloaliphatic, and/or aromatic dicarboxylic acids. These acids are preferably of a low molecular weight, i.e., having a molecular weight of less than about 300. However, in some cases higher molecular weight dicarboxylic acids may be used. The term "dicarboxylic acids" as used herein, includes equivalents of dicarboxylic acids having two functional carboxyl groups which perform substantially like dicarboxylic acids in reaction with glycols and diols in forming polyesters. These equivalents include esters and ester forming reactive derivatives, such as acid halides and anhydrides. The molecular weight preference mentioned above pertains to the acid and not to its equivalent ester or ester-forming derivatives. Thus, an ester of a dicarboxylic acid having a molecular weight greater than about 300 or an acid equivalent of a dicarboxylic acid having a molecular weight greater than about 300 are included provided the acid has a molecular weight below about 300. Additionally, the dicarboxylic acids may contain any substituent groups(s) or combinations which do not substantially interfere with the polymer formation and use of the polymer of this invention.

Aliphatic dicarboxylic acids, as the term is used herein, refer to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radical such as $-O-$ or $-SO_2-$.

Representative aliphatic and cycloaliphatic acids which can be used for this invention are sebacic acid, 1,2-cyclohexane dicarboxylic acid, 1,3-cyclohexane dicarboxylic acid, adipic acid, glutaric acid, succinic acid, oxalic acid, dimer acid, 4-cyclohexene-1, 2-dicarboxylic acid, 2-ethylsuberic acid, tetramethylsuccinic acid, cyclopentanedicarboxylic acid, decahydro-1,5 naphthlene dicarboxylic acid, 4,4'-bicyclohexyl dicarboxylic acid, decahydro-2,6 naphthalene dicarboxylic acid, 4,4 methylenebis(cyclohexane carboxylic acid), 3,4-furan dicarboxylic acid, and 1,1-cyclobutane dicarboxylic acid, Preferred aliphatic acids are cyclohexane dicarboxylic acids, sebacic acid, glutaric acid and adipic acid.

Representative aromatic dicarboxylic acids which can be used include terephthalic, phthalic and isophthalic acids, bi-benzoic acid, substitued dicarboxy compounds with two benzene nuclei such as bis(p-carboxyphenyl)methane, oxybis(benzoic acid). ethylene-1,2-bis(p-oxybenzoic acid), 1,5-naphthalene dicarboxylic acid 2,6-naphthalene dicarboxylic acid, 2,7-naphthalene dicarboxylic acid, phenanthrene dicarboxylic acid anthracene dicarboxylic acid, 4,4'-sulfonyl dibenzoic acid, and halo and $C_1-C_{12}$ alkyl, alkoxy, and aryl ring substitution derivatives thereof. Hydroxy acids such as p(beta-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids those with 8–16 carbon atoms are preferred, particularly the benzene dicarboxylic acids, i.e., phthalic, terephthalic and isophthalic acids and their dimethyl derivatives. Especially preferred is dimethylterephthalate.

Finally, where mixtures of dicarboxylic acids are employed in the practice of the present invention, it is preferred that at least about 60 mole %, preferably at least 80 mole %, based on 100 mole % of dicarboxylic acid (ii) be the same dicarboxylic acid or ester derivative thereof. As mentioned above, the preferred compositions are those in which dimethylterephthalte is the predominant dicarboxylic acid, most preferable when dimethylterephthalate is the only dicarboxylic acid.

The polyetherimide ester polymers of the present invention may be prepared by a one-pot synthesis involving the reaction of the diol (i), the dicarboxylic acid (ii), the high molecular weight poly(oxy alkylene)diamine (iii)(a)(1), and the tricarboxylic acid or its derivative (iii)(a)(2). In such a synthesis the polyoxyalkylene diimide diacid (iii)(b) is formed in-situ by the reaction of the poly(oxy alkylene)diamine with the tricarboxylic acid.

The poly(oxy alkylene)diamines (iii)(a)(1) suitable for use in the present invention may be represented by the following general formula

$$H_2N-G-NH_2 \qquad (I.)$$

wherein G is the radical remaining after the removal of the amino groups of a long chain alkylene ether diamine. These polyether diprimary diamines are available commericially from Texaco Chemical Company under the trademark JEFFAMINE. In general they are prepared by known processes for the amination of glycols. For example, they may be prepared by aminating the glycol in the presence of ammonia. Raney nickel catalyst and hydrogen as set forth in Belgium Pat. No. 634,741. Alternately, they may be prepared by treating glycol with ammonia and hydrogen over a Nickel-Copper-Chromium catalyst as taught by U.S. Pat. No. 3,654,370. Other methods for the production thereof include those taught by U.S. Pat. Nos. 3,155,728 and 3,288,895 and French Nos. 1,551,605 and 466,708, all of the foregoing patents being incorporated herein by reference.

The long chain ether diamines suitable for use herein are the polymeric diamines having terminal (or as nearly terminal as possible) amine groups and an average molecular weight of from about 600 to about 12,000, preferably from about 900 to about 4.000. Additionally, the long chain ether diamines will generally have a carbon-to-oxygen ratio of from about 1.8 to about 4.3.

Representative long chain ether diamines are the poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide); terminated poly(ethylene ether)diamine: and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1.5-pentanediol and subsequently aminating are useful. Especially preferred poly(alkylene ether) diamines are poly(propylene ether)diamine. poly (tetramethylene ether) diamine, and the poly(ethylene) glycols which are end-capped with poly(propylene ether) and/or propylene oxide and subsequently aminated.

In general, the polyoxyalkylene diamines useful in the practice of the present invention have an average molecular weight of from about 600 to about 12,000, preferably from about 900 to about 4,000.

The tricarboxylic acid (iii)(a)(2) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3', 4-diphenyl tricarboxylic anhydride, 3,3',5-benzophenone tricarboxylic anhydride 1,3,4-cyclopentane tricarboxylic anhydride. 2,2',3-diphenyl tricarboxylic anhydride, diphenyl sulfone-3,3',4-tricarboxylic anhydride, ethylene tricarboxylic anydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula

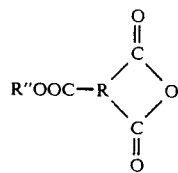

II.

wherein:

R is a trivalent organic radical, preferably a $C_1-C_{20}$ aliphatic or cycloaliphatic, or $C_6-C_{20}$ aromatic trivalent radical;

R" is preferably hydrogen or a monovalent organic radical which is preferably selected from $C_1-C_6$ aliphatic and/or cycloaliphatic radicals and $C_6-C_{12}$ aromatic radicals, e.g., benzyl; R" is most preferably hydrogen.

In the preparation of the instant polyetherimide ester polymers sufficient amounts of diol versus dicarboxylic acid, and tricarboxylic acid versus diamine must be present as recognized in the art, to allow for substantially complete polymerization.

This type of one-pot reaction involving the reactions of (i) a diol component, (ii) a dicarboxylic acid component, (iii)(a)(1) a poly(oxy alkylene) diamine component, and (iii) (a)(2) a tricarboxylic acid component is described in U.S. Pat. No. 4,556,688 to McCready et al. incorporated herein by reference. In this type of one-pot reaction the amount of diol (i) employed will be, in general, a molar excess, preferably about 1.5 molar equivalents, based on the combined molar equivalents of diicarboxylic acid (ii) and of the total moles of the tricarboxylic acid (iii)(a)(2). The amount of the tricarboxylic acid employed will preferably be about two molar equivalents based on the number of moles of the poly(oxy alkylene) diamine. Obviously, less than two molar equivalents would result in incomplete imidization of the diamine resulting in potentially poorer properties. Conversely, greater than two molar equivalents of the tricarboxylic acid may lead to cross-linking and/or branching of the polymer. Generally, mole ratios of 2 moles tricarboxylic acid to 0.85 to 1.15 moles of poly(oxy alkylene)diamine yield useful polymers.

The amount by which the diamine (iii)(a)(1) and the dicarboxylic acid (ii) are used is generally not critical in forming the polyetherimide esters of the present invention. However. preferred amounts of the poly(oxy alkylene)diamine and dicarboxylic acid used are such that the weight ratio of the theoretical amount of the polyoxyalklyene diimide diacid, formable from the poly(oxy alkylene)diamine and the tricarboxylic acid, to the dicarboxylic acid is from about 0.002 to 2.0:1, preferably from about 0.01 to 2.0:1, and more preferably from about 0.25 to 2.0, and most preferably from about 0.4 to 1.4. The actual weight ratio will be dependent upon the specific poly(oxy alkylene)diamine and tricarboxylic acid used and more importantly upon the desired physical and chemical properties of the resultant polyetherimide ester. In general, the lower ratio of the theoretical amount of polyoxyalklyene diimide diacid to dicarboxylic acid the better the strength, crystallization and heat distortion properties of the polymer. Alternatively, the higher the ratio, the better the flexibility, tensile set and low temperature impact characteristics.

The instant polyetherimide esters may also be prepared by a two-pot synthesis involving the reaction of the diol (i), the dicarboxylic acid (ii), and the polyoxyalkylene diimide diacid (iii) (b). Such a reaction is described in U.S. Pat. No. 4,556,705 to McCready, incorporated herein by reference. Basically, in this process the poly(oxy alkylene)diamine is reacted with the tricarboxylic acid to form a polyoxyalkylene diimide diacid, and the preformed polyoxyalkylene diimide diacid is then reacted with the diol and the dicarboxylic acid to form the polyetherimide ester polymers.

The polyoxyalkylene diimide diacid (iii)(b) may be represented b the general formula

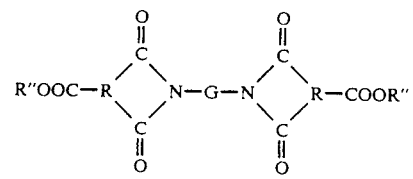

III.

wherein G, R and R" are as defined hereinafore.

The polyoxyalkylene diimide diacids of Formula III suitable for use herein are high molecular weight diimide diacids having an average molecular weight greater than about 700, preferably greater than about 900. They may be prepared by the imidization reaction of one or more tricarboxylic acids (iii)(a)(2) containing two vicinal carboxyl groups or an anhydride group and an additional carboxyl group which must be esterifiable with the high molecular weight poly (oxy alkylene)diamine (iii)(a)(1). These polyoxyalkylene diimide diacids and processes for their preparation are disclosed in U.S. Pat. No. 4,556,705, incorporated herein by reference.

Briefly, these polyoxyalkylene diimide diacids may be prepared by known imidization processes including melt synthesis or by synthesizing in a solvent system. Such reactions generally occur at temperatures from about 100° C. to about 300° C., preferably at temperatures from about 150 ° C. to about 250° C., while drawing off water or in a solvent system at the reflux temperature of the solvent or azeotropic (solvent) mixture.

In this two-pot process, as in the one-pot process described hereinafore, it is generally preferred that the diol be present in at least a molar equivalent amount, preferably a molar excess, most preferably at least 150 mole % based on the moles of dicarboxylic acid and polyoxyalkylene diimide diacid combined. Such molar excess of diol generally allows for optimal yields, based on the amount of acids, while accounting for the loss of diol during esterification.

In this two-pot process the amount of polyoxyalkylene diimide diacid and dicarboxylic acid utilized is generally not critical in forming the polyetherimide esters of the present invention. However, preferred amounts of the polyoxyalkylene diimide diacid and dicarboxylic acid are such that the weight ratio of the polyoxyalkylene diimide to the dicarboxylic acid is from about 0.002 to 2.0:1, preferably from about 0.01 to 2.01:1, , more preferably from about 0.25 to 2.0:1, and most preferably from about 0.4 to 1.4:1.

It is also possible, as described in U.S. Pat. No, 4,556,688, to prepolymerize the aromatic dicarboxylic acid and the diol to form a prepolyester, and then react this prepolyester with either the diimide diacid or with the tricarboxylic acid and the poly(oxy alkylene) diamine. Forming the prepolyester can be achieved by conventional esterification techniques such as those described in U.S Pat. Nos. 2,465,319 and 2,910,466, all of which are incorporated by reference.

In its preferred embodiment, the polyetherimide esters of the instant invention comprise the reaction products of dimethylterephthalate, optionally with up to 40 mole percent of another dicarboxylic acid or its ester forming derivative; butane diol, optionally with another diol such as butene diol, hexanediol, or cyclohexane dimethanol: and either a poly(oxy alkylene)diamine having and average molecular weight of from about 600 to about 12,000, preferably from about 900 to about 4,000, and trimellitic anhydride, or a polyoxyalkylene diimide diacid.

In the process of the present invention, particularly where all of the reactants are charged to the reactor together or where the polyoxyalkylene diimide diacid is preformed and excess tricarboxylic acid is present, a minor amount of the tricarboxylic acid or anhydride may react with available hydroxyl groups and ultimately function as a branching agent in the finished polymer. Within limits, the degree of branching in the finished polymer can be controlled by varying the mole ratio of tricarboxylic acid to poly(oxy alkylene)diamine. An excess of diamine reduces the degrees of branching, while an excess of the tricarboxylic acid increases branching. In addition to controlling branching by varying the tricarboxylic acid/diamine mole ratio, one can compensate for branching by introducing a monofuctional reactant such as benzoic acid in minor amounts.

With reference to branching, it should be noted that polymers of this invention, when prepared from preformed diimide diacid, are substantially free of branching. If branching is desired, one needs only to introduce a branching agent, such as trimellitic anhydride, along with the preformed diimide diacid. The amount of branching agent will generally be less than about 0.15 moles per mole of diimide diacid. Useful branching agents other than trimellitic anhydride include trimethyl trimellitate, glycerol, trimethylol propane, trimesic acid and its esters, and the like.

The instant polyetherimide esters may be prepared by conventional esterification/condensation reactions for the production of polyesters. These processes are described, inter alia, in U.S. Pat. Nos. 3,763,109; 3,651,014; 3,801,547; 4,556,705, and 4,556,688, all of which are incorporated herein by reference.

The polyetherimide esters of the instant invention contain at least the following two recurring structural units;

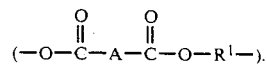

and

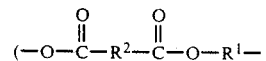

wherein:
A is the residue of the polyoxyalkylene diimide diacid absent the two carboxyl groups, i.e.,

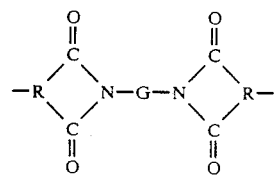

$R^1$ is the residue of the diol absent the two hydroxyl groups, $R^2$ is the residue of the dicarboxylic acid absent the two carboxyl groups, and G is as defined hereinafter.

Additionally, while not required, it is customary and preferred to utilize a catalyst or catalyst system In the process for the production of the present polyetherimide esters. These types of catalysts are set forth in U.S. Pat. Nos. 4,556,705 and 4,566,688 both of which are incorporated herein by reference.

Both batch and continuous methods can be used for any stage of the ether imide ester polymer preparation. Polycondensation of the polyester prepolymer with the polyoxyalkiene diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer.

The foregoing elastomers and elastomeric compositions may be rendered flame retardant or less flammable by the addition of a flame retardant effective amount of a mixture of (a) a polyphosphonate ester, and (b) an ammonium phosphate.

The polyphosphonate esters utilized in the present invention include polymeric pentaerythrityl phosphonates as are disclosed in U.S. Pat. No. 4,217,267, which is incorporated herein by reference. The preferred polyphosphonate ester utilized is of the formula $$[CL(C_{13}H_{17}O_6P_2)-C_{15}H_{22}O_7P_2]$$

and is the reaction product of $\alpha\alpha,\alpha'$-dichloro-p-xylene and a diethyl pentaerythritol. One particularly effective polyphasphonate ester is manufactured by American Cyanamid Company under the tradename Cyagard RF-1041.

The ammonium phosphates which are utilized in the present invention are known and may be prepared as exemplified in U.S. Pat. Nos. 3,428,343 and 3,513,114. They preferably have the general formula $(NH_4)_nH_2P_nO_{3n+1}$ wherein n is 1 or more or $(NH_4PO_3)_n$ wherein n represents an integer equal to or greater than 2. The molecular weight of the polyphosphates should preferably be sufficiently high so as to ensure a low solubility in water.

An example of such polyphosphates is the one marketed under the trademark "Exolit 263" (produced and sold by American Hoechst Corporation and which has the composition $(NH_4PO_3)n$ in which n if greater than 50. Still another example Is the product marketed under the trademark "Phos-Check P/30" (by Monsanto Chemical Co.) and Exolit 422 by American Hoechst Corporation which both have an analogous composition to Exolit 263.

The amount of the above mixture which is present in the instant compositions is an effective flame retardant amount. By effective flame retardant amount is meant an amount of the mixture which is effective to flame retard the elastomer utilized. Generally, this amount is at least about 10 weight percent, based on the total amounts of the flame retardant resin and the elastomer(s) present in the composition, preferably at least about 15 weight percent, and more preferably at least about 20 weight percent. Generally, an amount of about 60 weight percent of flame retardant mixture should not be exceeded, preferably an amount of about 55 weight percent of the mixture should not be exceeded, and more preferably an amount of about 50 weight percent of the mixture should not be exceeded. Generally, if the compositions contain less than about 10 weight percent of the mixture there is no significant improvement in the flame retardancy of the elastomer. Amounts of the mixture in excess of about 60 weight percent do not generally appreciably increase or improve the flame retardancy of the instant compositions.

Furthermore, the amount of the mixture used is generally dependent upon the particular compounds used in the mixture and upon the particular elastomer(s) present.

The weight ratio of the polyphosphonate ester to the ammonium polyphosphate in the flame retardant mixture that is employed is the composition of the present invention will preferably range from about 0.3 to about 4 to 1 and most preferably from about 1 to about 3 to 1. It is understood that the flame retardant mixture can contain more than one type of ammonium polyphosphate and/or more than one type of polyphosponate ester, depending upon the needs of the individual practitioner of the invention.

Finally, the flame retardant mixture may also contain an effective amount of a non-dripping agent. This amount will generally be from about 0.01 to about 5 parts by weight, preferably from about 0.05 to about 2.0 parts by weight, based on 100 parts of resinous component (A). Suitable non-dripping agents are well-known and widely available. They include the fumed and colloidal silicas and polytetrafluoroethylene resins. Especially preferred are the polytetrafluoroethylene resins, most preferably TEFLON ® 6 from E. I. DuPont.

While the compositions of this invention possess many desirable properties, it is sometimes advisable and preferred to further stabilize certain of the compositions against thermal or oxidative degradation as well as degradation due to ultraviolet light. This can be done by incorporating stabilizers into the blend compositions. Satisfactory stabilizers comprise phenols and their derIvatIves, amines and theIr derIvatIves, compounds containing both hydroxyl and amine groups, hydroxyazines, oximes, polymeric phenolic esters and salts of multivalent metals in which the metal is in its lower state.

RepresentatIve phenol derIvatIves useful as stabilizers include 3,5-di-tert-butyl-4-hydroxy hydrocinnamic triester with 1,3,5-tris-(2-hydroxyethyl-s-triazine-2,4,6-(1H, 3H, 5H) trione: 4,4'-bis(2,6-ditertiary-butylphenyl): 1,3,5-trimethyl-2,4,6-tris-(3,5-ditertiary-butyl-4-hydroxylbenzyl) benzene and 4,4'-butylidene-bis(6-tertiary-butyl-m-cresol). Various inorganic metal salts or hydroxides can be used as well as organic complexes such as nickel dibutyl dithiocarbamate, manganous salicylate and copper 3-phenyl-salicylate. Typical amine stabilizers include N,N'-bis(beta-naphthyl)-p-phenylenediamine; N,N'-bis(1-methylheptyl)-p-phenylenediamine and either phenyl-beta-napththyl amine or its reaction products with aldehydes. Mixtures of hindered phenols with esters or thiodipropionic, mercapides and phosphite esters are particularly useful. Additional stabilization to ultraviolet light can bé obtained by compounding with various UV absorbers such as substituted benzophenones and/or benzotriazoles.

In addition, other additives, such as pigments and, for example, other compatible resin systems, can also be present in the composition of the present invention.

One particularly compatible resin is poly(butylene terephthalate)polymer, most preferably poly(1,4-butylene terephthalate)homopolyester.

While poly(1,4-butylene terephthalate)homopolyester is the preferred poly(butylene terephthalate) polymer, copolyesters thereof are also suitable. Such copolyesters generally comprise at least about 70 mole percent, and preferably at least 80 mole percent, based on total monomer content of butylene and terephthalate units. The comonomer may be either a dicarboxylic acid or diol or a combination of the two. Suitable dicarboxylic acid comonomers include the $C_8$ to $C_{16}$ aromatic dicarboxylic acids, especially the benzene dicarboxylic acids, i.e. phthalic and isophthalic acids and their alkyl, e.g. methyl, derivatives and $C_4$ to $C_{16}$ aliphatic and cycloaliphatic dicarboxylic acids including the example sebacic acid: glutaric acid: azelaeic acid; tetramethyl succinic acid; 1,2-, 1,3- and 1,4-cyclohexane dicarboxylic acids and the life, as mentioned above. Suitable diol comonomers include but are not limited to $C_2$ to $C_8$ aliphatic and cycloaliphatic diols, e.g. ethylene glycol, hexanediol, butanediol and 1.2-, 1,3- and 1.4-cyclohexanedimethanol. Other suitable diols are well-known to those skilled in the art.

The following examples are presented to more fully and clearly illustrate the present invention. They are presented as illustrative of the invention and are not to be construed as limiting the invention thereto. In the examples all parts and percentages are on a weight basis unless otherwise indicated.

Unless otherwise stated, all compositions were prepared by dry blending the ingredients followed by extrusion through a single screw extruder at 460° F. Test specimens were prepared by injection molding in accordance with proper specifications for ASTM and UL determinations.

The following ASTM methods were used in determining the physical characteristics of the compositions:

| | |
|---|---|
| Flexural Modulus | ASTM D790 |
| Tensile Elongation | ASTM D638 |
| Notched Izod | ASTM D256 |
| Tensile Strength | ASTM D638 |

Flammability tests were performed in following with the procedure of Underwriter's Laboratory Bulletin 94 entitled "Tests for Flammability of Plastic Materials. UL94". According to this procedure, the materials were classified as either UL94 HB, UL94 V-0, UL94 V-I or UL94 V-II on the basis of the test results obtained for five samples. The criteria for each of these flammability classifications according to UL94, are, briefly, as follows:

HB: In a 5 inch sample, the rate of burn of the sample is less than 3 inches per minute, and the flames should be extinguished before 4 inches of sample are burned.

V-0: the average period of flaming and/or smoldering after removing the igniting flame should not exceed five seconds and none of the samples should produce drips of particles which ignite absorbent cotton.

V-I: the average period of flaming and/or smoldering after removing the igniting flame should not exceed twenty-five seconds and none of the samples should produce drips of particles which ignite absorbent cotton.

V-II: the average period of flaming and/or smoldering after removing the igniting flame should not exceed twenty-five seconds and the samples produce drips of burning particles which ignite burning cotton.

Example 1 illustrates a composition falling outside the scope of the instant invention and is presented for comparative purposes only.

EXAMPLE 1

A polyetherimide ester elastomer comprised of the reaction products of dimethylterephthalate, butanediol, polyoxyalkylene diimide diacid is molded into test bars measuring 5"×½"× 1/16". These test bars are subject to the test procedure set forth in Underwriters Laboratories UL94 Bulletin, and the results are set forth in Table II below.

EXAMPLES 2-3

Examples 2-3 utilize the elastomer of Example I and are exemplary of the present invention. These Examples, which are formulated as per Table I, were molded into test bars of the same dimensions as in Example I. These test bars were subjected to the UL-94 test and the results are set forth in Table II. Furthermore, these bars were tested for various physical properties, the results of which tests are set forth in Table III.

In Table I, the polyetherimide ester component is indicated by the initials "PEIE". All parts in Table I are listed in terms of percent by weight.

TABLE I

| Example | 1 | 2 | 8 |
|---|---|---|---|
| PEIE | 100 | 68 | 48 |
| STAB | — | 0.5 | 0.5 |
| TEFLON 6 | — | 0.5 | 0.5 |
| PE | — | 15.0 | 15.0 |
| APP | — | 15.0 | 15.0 |
| TiO$_2$ | — | 1.0 | 1.0 |
| PBT | — | — | 20.0 |

NOTE: STAB is a hindered phenol antioxidant stabilizer, Irganox 1076, manufactured by Ciba-Geigy.
PE is a polyphosphonate ester, Cyagard RF-1041, from American Cyanamid.
APP is ammonium polyphosphate.
TiO$_2$ is titanium dioxide, a pigment.
PBT is a poly(butylene terephthalate resin) from General Electric Company (Valox ® 315).

TABLE II (UL 94 Rating)

| Example | |
|---|---|
| 1 | burns |
| 2 | VO |
| 3 | VO |

TABLE III

| Example | 1 | 2 | 3 |
|---|---|---|---|
| ⅛" Notched Izod (ft. lbs/in.) | NB | 2.7 | 2.0 |
| Flexural Modulus, psi | 17,000 | 15,400 | 81,100 |
| Tensile Strength, psi | 1,700 | 1,170 | 1,600 |
| Tensile Elongation, % | 160 | 149 | 70 |

From the above data, it is apparent that the flame retardant mixture of the present invention serves to adequately render the copolyetherester materials of the present invention flame retardant without any significant sacrifice of the materials' desirable physical properties.

What is claimed is:

1. A flame retardant thermoplastic composition comprising:
    (A) at least one polyetherimide ester resin;
    (B) a flame retardant effective amount of a mixture comprising (i) at least one polymeric pentaerythrityl polyphosphonate ester, and (ii) at least one ammonium polyphosphate.

2. The composition of claim 1 which contains at least about 10 weight percent of said mixture, based on the total amount of a said mixture and said polyetherimide ester resin present.

3. The composition of claim 2 which contains at least about 15 weight percent of said mixture.

4. The composition of claim 3 which contains at least 20 weight percent of said mixture.

5. The composition of claim 1, where the weight ratio of the polyphosphonate ester compound of the mixture to the ammonium polyphosphate component of the mixture ranges from about 0.3 to about 4 to 1.

6. The composition of claim 5 wherein said ratio ranges from about 1 to about 3 to 1.

7. The composition of claim 1 wherein the ammonium polyphosphate has the composition ($NH_4PO_3)_n$ wherein n is greater than 50.

8. The composition of claim 1 which further contains poly(butylene terephthalate)resin.

9. The composition of claim 8 wherein the poly(butylene terephthalate)resin is poly(1,4-butylene terephthalate).

10. The composition of claim 1 wherein said polyetherimide ester resin is comprised of the reaction products of:
    (a) at least one diol;
    (b) at least one dicarboxylic acid or an ester forming reactive derivative thereof: and
    (c) a set of reactants selected from
        (1) (i) at least one high molecular weight poly(oxy alkylene)diamine, and (ii) at least one tricarboxylic acid or a derivative thereof, or
        (2) at least one high molecular weight polyoxyalkylene diimide diacid.

11. The composition of claim 10 wherein said diol has a molecular weight of about 300 or less.

12. The composition of claim 10 wherein said diol contains from 2 to about 15 carbon atoms.

13. The composition of claim 12 wherein said diol is selected from butanediol, butenediol, hexanediol, cyclohexane dimethanol, or mixtures thereof.

14. The composition of claim 10 wherein said dicarboxylic acid or its derivative is an aromatic dicarboxylic acid or its derivative.

15. The composition of claim 10 wherein (c) is (1).

16. The composition of claim 15 wherein said high molecular weight poly(oxy alkylene)diamine is represented by the formula $$H_2N-G-NH_2$$

wherein G is the radical remaining after the removal of the amino groups of a long chain alkylene ether diamine.

17. The composition of claim 16 wherein said poly(oxy alkylene)diamine has an average molecular weight of from about 600 to about 12,000.

18. The composition of claim 17 wherein said poly(oxy alkylene)diamine is selected from poly(ethylene)diamine. poly(propylene ether)diamine, poly (tetramethylene ether)diamine. copoly(propylene etherethylene ether)diamine, or mixtures thereof.

19. The composition of claim 15 wherein said tricarboxylic acid or its derivative is represented by the formula

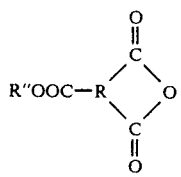

wherein R is a $C_1$ to $C_{20}$ trivalent aliphatic, cycloaliphatic or aromatic radical, and R" is hydrogen or a $C_1-C_6$ aliphatic monovalent radical.

20. The composition of claim 19 wherein said trioarboxylic acid or its derivative is trimellitic anhydride.

21. The composition of claim 10 wherein (c) is (2).

22. The composition of claim 21 wherein said high molecular weight polyoxyalkylene diimide diacid is represented by the formula

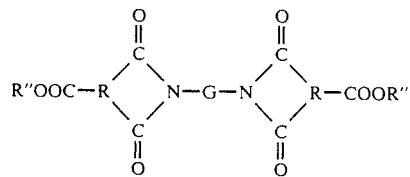

wherein:
  each R is independently selected from $C_1-C_{20}$ aliphatic, cycloaliphatic or aromatic trivalent organic radicals:
  each R" is independently selected from hydrogen, $C_1-C_6$ aliphatic or cycloaliphatic organic radicals or $C_6-C_{12}$ aromatic monovalent organic radicals; and
  G is the radical remaining after the removal of the amino groups of a long chain alkylene ether diamine.

23. The composition of claim 22 wherein said long chain alkylene ether diamine has an average molecular weight of from about 600 to about 12,000.

24. The composition of claim 23 wherein each R is a $C_6$ trivalent aromatic hydrocarbon radical and each R" is hydrogen.

25. The composition of claim 1 wherein said polyetherimide ester resin is comprised of at least the following recurring structural units:

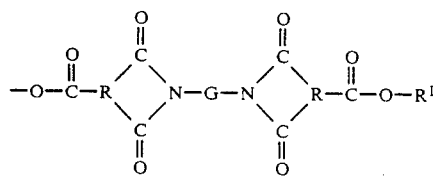

and

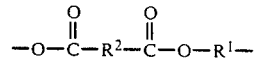

wherein:
  R is the residue of a diol absent the two hydroxyl groups;
  $R^1$ is the residue of a dicarboxylic acid absent the two carboxyl groups;
  $R^2$ is a trivalent organic radical; and
  G is the radical remaining after the removal of the amino groups of a long chain poly(oxy alkylene) diamine.

26. The composition of claim 25 wherein said poly(oxy alkylene) diamine has an average molecular weight of from about 600 to about 12,000.

27. The composition of claim 25 wherein $R^2$ is the residue of an aromatic dicarboxylic acid.

28. The composition of claim 27 wherein $R^2$ is the residue of dimethylterephthalate.

29. The composition of claim 27 wherein $R^1$ is the residue of a diol having a molecular weight of about 250 or less.

30. The composition of claim 29 wherein said diol is selected from butanediol, butenediol, hexanediol, cyclohexane dimethanol or mixtures thereof.

31. The composition of claim 1 which further contains an effective stabilizing amount of at least one thermal stabilizer.

* * * * *